United States Patent

Bruch et al.

[11] Patent Number: 5,310,197
[45] Date of Patent: May 10, 1994

[54] GASKET CONSTRUCTION

[75] Inventors: Cynthia F. Bruch, Magnolia; Mark W. Craig, Chillicothe; Dale E. Geyer, Peoria; Lynette M. Lipski, Peoria; Roger A. McHugh, Peoria; Tana L. Utley, Metamora, all of Ill.

[73] Assignee: Caterpillar Inc., Peoria, Ill.

[21] Appl. No.: 844,563

[22] PCT Filed: Apr. 26, 1991

[86] PCT No.: PCT/US91/02830

§ 371 Date: Mar. 2, 1992

§ 102(e) Date: Mar. 2, 1992

[87] PCT Pub. No.: WO92/19892

PCT Pub. Date: Nov. 12, 1992

[51] Int. Cl.$^5$ .................................... F17J 15/12
[52] U.S. Cl. ............................. 277/235 B; 277/227
[58] Field of Search ............... 277/235 B, 231, 232, 277/9, 227, 235 R, 235 A; 29/888.3

[56] References Cited

U.S. PATENT DOCUMENTS

| | | | |
|---|---|---|---|
| 2,359,118 | 9/1944 | Johnston | 277/232 |
| 2,580,546 | 1/1952 | Hobson, Jr. | 277/232 |
| 3,207,644 | 9/1965 | Hobson, Jr. et al. | 277/232 |
| 3,565,449 | 2/1971 | Ascencio et al. | 277/235 B |
| 4,331,336 | 5/1982 | Czernik | 277/1 |
| 4,376,539 | 3/1983 | Baldacci | 277/1 |
| 4,465,287 | 8/1984 | Binde et al. | 277/235 B |
| 4,480,844 | 11/1984 | Kozerski | 277/235 B |
| 4,605,236 | 8/1986 | Tsuchihashi et al. | 277/235 B |
| 4,635,949 | 1/1987 | Lucas | 277/235 B |
| 4,659,410 | 4/1987 | McDowell et al. | 277/235 B X |

FOREIGN PATENT DOCUMENTS

| | | |
|---|---|---|
| 3229805A1 | 2/1984 | Fed. Rep. of Germany. |
| 3915640 | 11/1990 | Fed. Rep. of Germany ... 277/235 B |
| 1327379 | 12/1963 | France. |
| 2053829 | 4/1971 | France .......................... 277/235 B |
| 0050257 | 3/1985 | Japan .......................... 277/235 B |
| 0232368 | 10/1986 | Japan .......................... 277/235 B |

OTHER PUBLICATIONS

Webster's New World Dictionary, Simon and Schuster, Inc New York, N.Y., 1988, p. 1368.

Primary Examiner—William A. Cuchlinski, Jr.
Assistant Examiner—D. DePumpo
Attorney, Agent, or Firm—Larry G. Cain

[57] ABSTRACT

A head gasket assembly (18) is used for sealing a joint between a cylinder block (12) and a cylinder head (14). At least portions of the head gasket assembly (18) must withstand high temperatures, high pressures and be flexible for sealing fluid passages such as lubricating oil and cooling water mixtures. The present head gasket assembly (18) is comprised of a main gasket body (40) constructed of a sealing material (46) having a plurality of apertures (48,50,52) positioned therein. A portion of the plurality of apertures (48,50,52) includes a combustion opening (52) having a first ring (54) positioned in the periphery of the combustion opening (52). A plurality of tape strips (60) having an end portion (62) attached to a side of the sealing material (46), partially surrounding the fire ring (54) and another end portion (64) attached to the other side of the sealing material (46). Thus, the flexible main gasket body (40) and the rigid fire rings (54) are fixedly attached together and provide a head gasket assembly (18) which has very good handleability, sealability and functional characteristics.

16 Claims, 3 Drawing Sheets

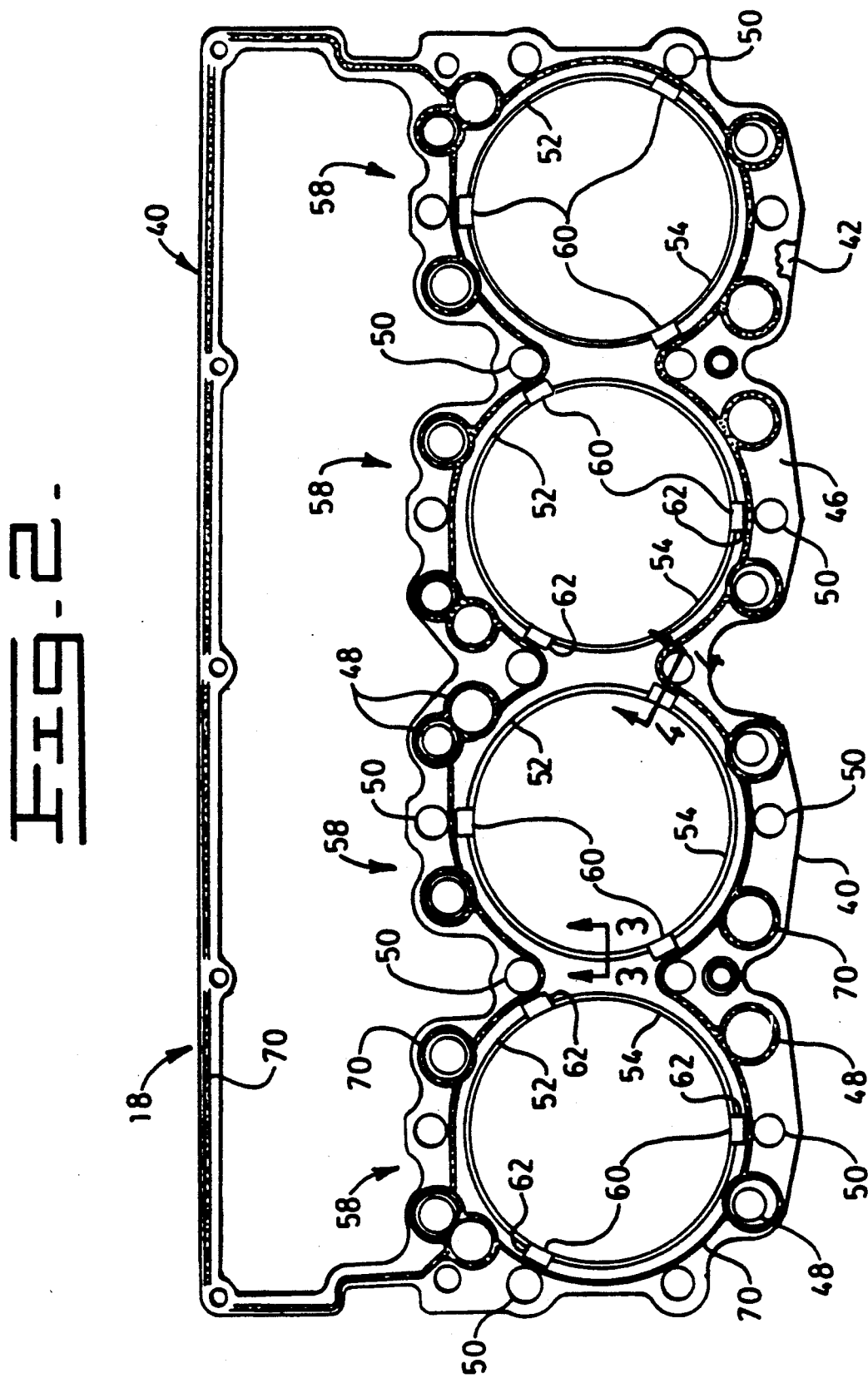

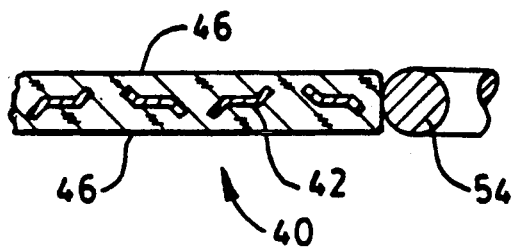
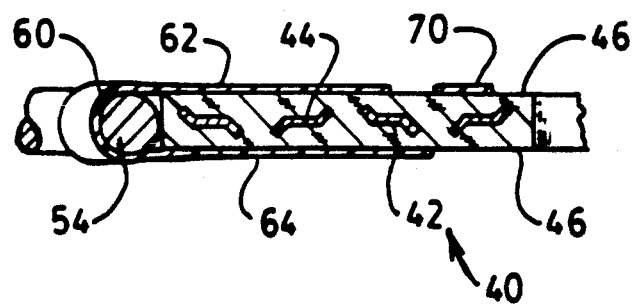
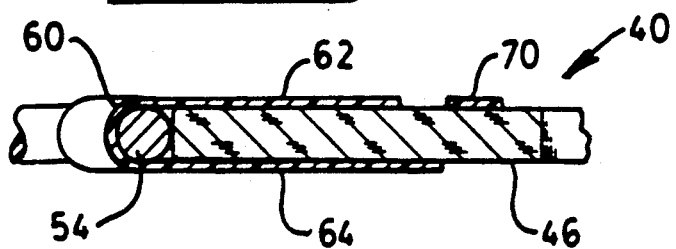

GASKET CONSTRUCTION

DESCRIPTION

1. Technical Field

This invention relates to gaskets, and more particularly relates to the structure for securingly retaining a sealing element or fire ring to the body of a gasket having the grommet or fire ring positioned in a aperture of the body.

2. Background Art

There are a variety of head gaskets known in the prior art. Head gaskets generally are made of relatively thin, generally flat bodies which define a plurality of apertures, including oil and water bores and combustion openings.

The sealing of an internal combustion engine is a complex and difficult matter. High temperatures and pressure which are localized and which vary across the surface of the gasket between the block and the head require differing treatments at different areas, and usually require the use of sealing aids such as grommets, elastomeric seals, armoring and the like. As an example, in high compression engines operating at high temperatures and high pressures, it has been a practice for a number of years to provide head gaskets with armoring adjacent the cylinder or combination openings to seal the combustion openings and to protect the remainder of the gasket from the effects of the high temperature and pressure. Early armor covered the entire gasket surface as well as the edges of the combustion openings. More recently, the armor has been used to embrace only the edges of the gasket body adjacent the combustion openings to seal the head and block around the combustion opening.

Frequently, the gasket body itself is made of thin elastomeric bonded sheets laminated to a central metallic core. In such gaskets the armoring has generally been comprised of a U-shaped annulus which overlies the periphery of the main gasket body adjacent the combustion opening and which encloses one or more wire rings. An example of such an arrangement is disclosed in U.S. Pat. No. 4,331,336 issued to Daniel E. Czernik et al on May 25, 1982, The U-shaped annulus extends to the periphery of the combustion opening in the body and is retained by a plurality of tabs which overlap the peripheral edge of the gasket body supporting the armoring within the combustion opening.

In another U.S. Pat. No. 4,605,236 issued to Keiichi Tsuchihashi et al on Aug. 12, 1986 a head gasket is disclosed in which a grommet is generally U-shaped in cross-section. The grommet has spaced ends at least one of which is bent inwardly to engage a bore wall of the gasket to securely hold the grommet in place within a gasket opening.

The above-listed patents disclose a U-shaped flange for attaching a solid ring to a gasket body. The thin walled U-shaped flange may become destroyed or burnt through by the high temperatures and high combustion pressures within the combustion chamber of an engine. Thus, a leak path is created from the combustion chamber and the remainder of the gasket is no longer protected from the high temperatures and high pressures. Another problem which is sometimes evident in this type of construction is that the heat from the combustion chamber is transmitted through the thin walled U-shaped flange into the gasket material. When this occurs, the heat causes laminated elastomeric bonded sheet material to harden reducing the sealing characteristics of the material and eventual failure of the heat gasket.

In an attempt to alleviate the heat transferring problem and the failure of the thin walled U-shaped flange described above, U.S. Pat. No. 4,376,539 issued to John W. Baldacci on Mar. 15, 1983 discloses a multilayer gasket main body defining water and oil apertures and a combustion opening and a fire ring is supported in the combustion opening. The fire ring is supported in the combustion opening by individual U-shaped tabs. The tabs are bonded to the annulus of the fire ring by a spot-weld or adhesive mass and supports the annulus in the combustion opening.

Another problem which has been defined when using the above-described head gasket designs is that the thin walled steel flange holding the combustion seal or wire ring in place during assembly absorbs some of the bolt load during the torquing process. The flange further absorbs some of the load during the thermal cycling of the engine. Because the flange absorbs a portion of the load, the assembled load into the wire ring is reduced. This is not a desirable characteristic for some head-to-block joints because the load absorbed in the flange is not available to be applied to the wire ring. Some recently designed head gaskets have reduced the amount of flange overlapping the body of the gasket to minimize load taken away from the wire ring. In other head gaskets the flange has been entirely eliminated. For example, in some head gaskets when the flange has been eliminated the wire ring is either glued directly to the gasket material or the wire ring has protrusions extending therefrom which are used to attach the ring to the gasket material. In a head gasket having a rather rigid core this process of attaching the wire ring to the gasket material has been rather successful. However, in gaskets wherein the core is more flexible or less rigid, the above described techniques for attaching the wire ring to the gasket material are less successful.

The present invention is directed to overcoming one or more of the problems as set forth above.

DISCLOSURE OF THE INVENTION

In one aspect of the invention, a head gasket assembly has been adapted for use in an engine. The engine has a cylinder block and a cylinder head. The cylinder block has a combustion chamber, a plurality of threaded holes and a plurality of bores defined therein and the cylinder head has a plurality of bores therein corresponding to the threaded holes and at least a portion of the plurality of bores in the cylinder block. The head gasket assembly is comprised of a main gasket body having a center core, a sealing material attached to each side of the core and a plurality of apertures defined within the main gasket body and extending through the sealing material and the core. The plurality of apertures include a combustion opening and at least a portion of the plurality of apertures correspond to the combustion chamber, the plurality of threaded holes and the plurality of bores in the cylinder block when in use. The head gasket assembly is further comprised of a fire ring positioned in each combustion opening and means for attaching the fire ring to the sealing material prior to being installed in the engine. The means for attaching includes a plurality of tape strips having an end portion attached to a side of the sealing material, partially surrounding the fire ring and having another end portion attached to another side of the sealing material.

In another aspect of the invention, a head gasket assembly is adapted for use in an engine. The engine has a cylinder block and a cylinder head. The cylinder block has a combustion chamber, a plurality of threaded holes and a plurality of bores defined therein. The cylinder head has a plurality of bores defined therein corresponding to the threaded holes and at least a portion of the plurality of bores in the cylinder block. The head gasket assembly is comprised of a main gasket body being constructed of a sealing material and having a plurality of apertures defined within the main gasket body and extending through the sealing material. The plurality of apertures include a combustion opening and at least a portion of the plurality of apertures correspond to the combustion chamber, the plurality of threaded holes and the plurality of bores in the cylinder block when in use. The head gasket assembly is further comprised of a fire ring positioned in each combustion opening and means for attaching the fire ring to the sealing material prior to being installed in the engine. The means for attaching includes a plurality of tape strips, each tape strip has an end portion attached to a side of the sealing material, partially surrounds the fire ring and has another end portion attached to the other side of the sealing material.

In another aspect of the invention, an engine is comprised of a cylinder block and a cylinder head. The cylinder block has a combustion chamber, a plurality of threaded holes and a plurality of bores defined therein. The cylinder head has a plurality of bores defined therein corresponding to the threaded holes and at least a portion of the plurality of bores in the cylinder block. A head gasket assembly is sealingly positioned between the cylinder block and the cylinder head. The head gasket assembly includes a main gasket body being constructed of a sealing material and having a plurality of apertures defined within the main gasket body extending through the sealing material. The plurality of apertures include a combustion opening and at least a portion of the plurality of apertures corresponding to the the combustion chamber, the plurality of threaded holes and the plurality of bores in the cylinder block. A fire ring is positioned in each combustion opening and means for attaching the fire ring to the sealing material prior to being installed in the engine. The means for attaching includes a plurality of tape strips, each tape strip has an end portion attached to a side of the sealing material, partially surrounds the fire ring and has another end portion attached to the other side of the sealing material.

In another aspect of the invention, a gasket assembly includes a main gasket body having a sealing material and having a plurality of apertures defined within the main gasket body and extending through the sealing material. A sealing element is position in at least a portion of the plurality of apertures. And, the gasket assembly further includes means for attaching the sealing element to the sealing material. The means for attaching includes a plurality of tape strips and each of the tape strips has an end portion attached to a side of the sealing material, partially surrounds the sealing element and has another end attached to another side of the sealing material.

BRIEF DESCRIPTION OF THE DRAWINGS

FIG. 2 is a top view of head gasket assembly having an embodiment of the present invention;

FIG. 3 is an enlarged broken out sectional view taken along lines 3—3 of FIG. 2;

FIG. 4 is an enlarged broken out sectional view taken along lines 4—4 of FIG. 2; and FIG. 5 is an enlarged broken out sectional view of a head gasket assembly having an embodiment of the present invention.

BEST MODE FOR CARRYING OUT THE INVENTION

Figure 1:
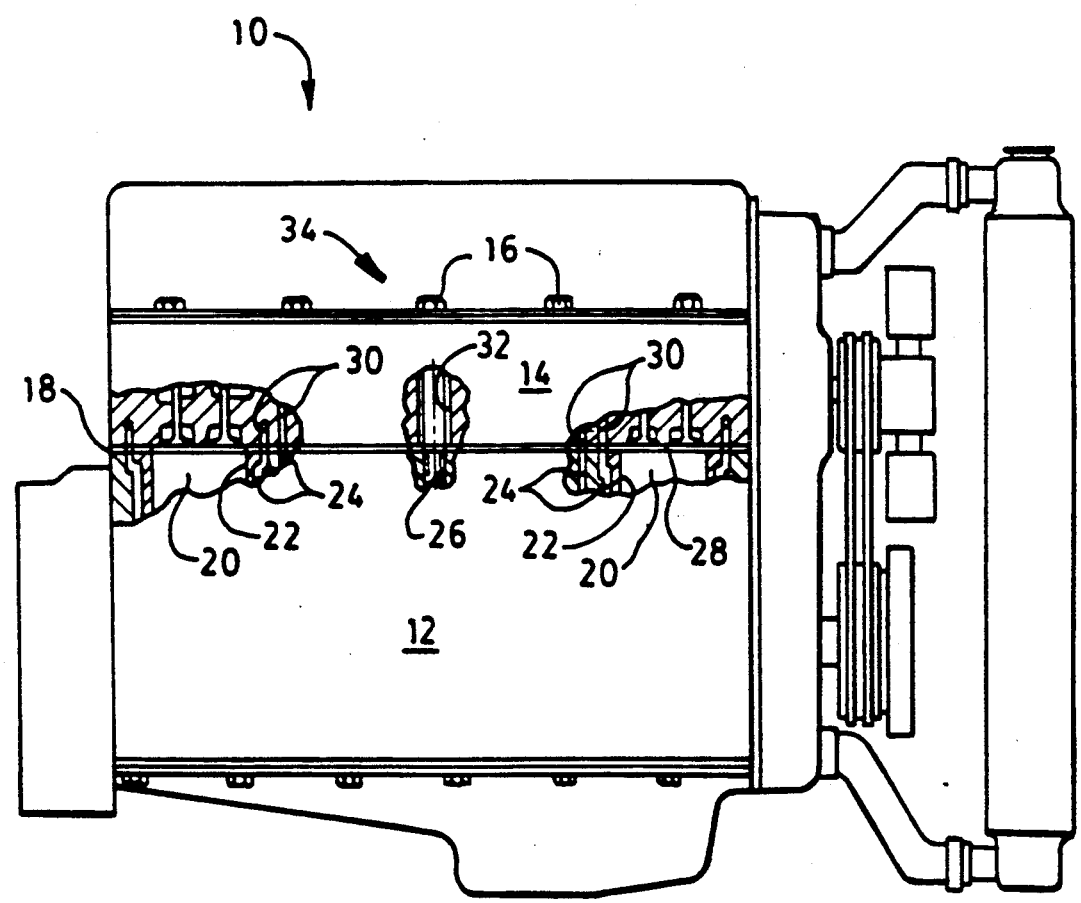
FIG. 1 is a side view of an engine with sections broken away showing internal passages and relationships and having an embodiment of the present invention.

As best shown in FIG. 1, an internal combustion engine 10 includes a cylinder block 12, and a cylinder head 14 removably attached to the cylinder block 12 by a plurality of bolts 16 in a conventional manner. A gasket which in this application is a head gasket assembly 18 is sealingly positioned between the cylinder block 12 and the cylinder head 14.

The block 12 defines a plurality of apertures including a plurality of combustion cylinders or chambers 20 each having a liner 22 therein, a plurality of oil and water bores 24 and a plurality of threaded holes 26, of which only one is shown. As an alternative, the block 12 could have the plurality of combustion cylinders or chambers 20 defined directly therein. The head 14 defines a combustion chamber portion 28 overlying each chamber 20, and further defines a plurality of oil and water bores 30 which are aligned with the complementary bores 24 in the block 12. The head 14 further defines a plurality of bores 32 therethrough which are aligned with the plurality of threaded holes 26 in the block 12. Each of the plurality of bolts 16 pass through one of the plurality of bores 32 in the head 14 and is threadedly engaged into a corresponding one of the plurality of threaded holes 26 in the block 12. Each of the plurality of bolts 16 serve as a means 34 for torquing and compressing the head gasket assembly 18 into sealing engagement with the block 12 and had 14.

As best shown in FIGS. 2, 3 and 4, the head gasket assembly 18 includes a generally rectangular shaped main gasket body 40. The main gasket body 40 includes a center metallic core 42. The core 42 may consist of a rather flexible perforated plate 44 or as an alternative the plate may be relatively flat, ridged and non-flexible. It is conventional to use a steel, copper or aluminum plate for the core material. Each side of the core 42 is attached to a heat-sensitive multilayer or composite sealing material 46. Examples of material used for the sealing material include a soft metallic or non-metallic material, such as mild steel, a nitrile rubber, a heat curable liquid silicone, a fluoroelastomer, a thermoplastic resin having a filler therein or a graphite facing. The sealing materials 46, if required, are impregnated with a conventional temperature, oil and water resistant impregnate. Other suitable materials may be used for either the core 42 of the sealing material 46. After the core 42 and the sealing material 46 have been bonded or affixed together, a plurality of apertures including oil passages and water passages 48 and bolt hole passages 50 are formed such as by punching through the core 42 and the sealing material 46. The plurality of passages 48 correspond to at least a portion of the appropriate plurality of oil and water bores 24 in the block 12 and to the appropriate plurality of oil and water bores 30 in the head 14. The bolt hole passages 50 correspond to the plurality of threaded holes 26 in the block 12 and the plurality of bores 32 in the head 14. Another portion of the plurality of aperture 48 are formed by the punching operation and include a plurality of combustion openings 52 which correspond to the plurality of combustion cylinders or chambers 20 in the block 12. Each of the plurality of combustion openings 52 have a sealing element or fire ring or wire ring 54 provided in each combustion opening 52. The fire ring 54 is positioned at the periphery of the combustion opening 52 and is generally in contact with the sealing material 46. Depending on the engine or application, the wire ring to be used may be flat, round, elliptical or otherwise, and may be so shaped, as with flats or may be otherwise modified to any configuration. The fire ring 54 is constructed of a deformable material, such as annealed steel or copper. In this application, the fire ring 54 is formed by welding a wire into a circular ring having a welded joint. The wire is circular in cross-section and made of annealed stainless steel. The fire ring 54 is attached to the sealing material 46 of the main gasket body 40 by a means for attaching 58 which includes a plurality of tape strips 60. An end portion 62 of each tape strip 60 is attached to one side of the sealing material 46. The tape strip 60 extends partially around the fire ring 54 and another end portion 64 is attached to the other side of the sealing material 46. When placing the tape strip 60 around the wire ring 54, caution must be taken to place the tape strip 60 in the area away from the welded joint. In this application, an individual tape strip 60 is positioned near three of the bolt hole passages 50. This distribution provides an even spacing of approximately 120 degrees about the fire ring 54. Each of the plurality of tape strips 60 is made from a Teflon film having a thickness of approximately 0.05 mm and has a silicone adhesive having a thickness of approximately 0.04 mm attached to one side. As an alternative, the strip 60 can be made of any appropriate material having sufficient strength and a relative small thickness. Furthermore, as an alternative, the adhesive can be made of an acrylic or rubber base provided the ability to remain attached to the sealing material is retained. In this application the strip has a length of approximately 18 mm, width of approximately 14 and mm and a total thickness of approximately 0.09 mm. A variety of criteria was developed in choosing the proper tape. For example, the tape strip 60 must attach or bond well to the main gasket body 40 so that the main gasket body 40 and the wire ring 54 attached thereto will remain secured to each other during handling, the tape strip 60 must not affect combustion sealing and the tape strip 60 must be easily assembled to the gasket body 40. As an alternative the tape strip 60 may shear upon assembly of the cylinder head 14 to the cylinder block 12 when the torque is applied by the plurality of bolts 16. Or, as a further alternative, the tape strip 60 may stretch provided the combustion sealing is not affected. As a further alternative, the tape strips 60 can be used to attach other sealing elements 54 such as grommets or O-rings to any of the apertures 48 within any type of a gasket 18 regardless of its position and use.

As an alternative to the head gasket assembly 18 as described above, a second sealing material 70 may be applied to the sealing material 46. For example, as is best shown in FIGS. 2 and 4, a raised bead of the second sealing material 70 is applied to preestablished portions of the sealing material 46. It should be further noted that each of the strips 60 do not overlap the second sealing material 70 when assembled to the sealing material 46. In this application the second sealing material 70 is applied to only one side of the sealing material; however, as an alternative, the second sealing material 70 may be applied to both or either side of the sealing material 46. Examples of such areas or portions to have the second sealing material 70 applied thereto are around the plurality of apertures 48 and about a portion of the periphery of the main gasket body 40. It should be noted that the raised bead of the second sealing material 70 is spaced from the plurality of apertures 48 and the periphery of the main gasket body 40. In this application the distance from the periphery of the main gasket body is about 2 mm, the distance from oil and water passages 48 is at a minimum about 3 mm and the distance from the periphery of the combustion opening 52 is at least a distance greater than either of the distances from the periphery of the main body and the plurality of oil and water apertures 50.

As an alternative and best shown in FIG. 5, the main gasket body 40 of the head gasket assembly 18 could be formed of a composite sealing material 46 and the core 42 would be eliminated. The remainder of the head gasket assembly 18 would remain as described above.

Industrial Applicability

The head gasket assembly 18 is used to seal the joint between the cylinder block 12 and the cylinder head 14. The head gasket assembly 18 must perform several functions in order to satisfactorily seal the above-mentioned joint. For example, the sealing material 46 must be compressible but on the other hand resilient enough to remain in sealing contact between the cylinder block 12 and the cylinder head 14. The second sealing material 70 must also be compressible and resilient enough to remain in sealing contact between the sealing material 46 and the cylinder head 14. And lastly, the fire ring 54 must be compressible and resilient enough to remain in sealing contact between the cylinder block 12 and the cylinder head 14 even during the high temperature and high load being applied from the combustion cycle during the engine 10 operation.

Experience has shown that one primary consideration to be concerned with when assembling the head gasket assembly 189 into the engine 10 is the handleability of the head gasket assembly 18. As the engine cylinder block 12 is traveling down the assembly line, an assembler removes the head gasket assembly 19 from a shipping and receiving crate. The assembler carries the head gasket assembly 18 from the crate to the cylinder block 12 and properly positions the gasket 18 relative to the cylinder block 12. After the gasket 18 has been positioned on the cylinder block 12, the cylinder head 14 is lowered on the gasket 18, the plurality of bolts 16 are secured into the cylinder block 12, sealing and assembling the cylinder block 12, head gasket assembly 18, and the cylinder head 14 relative to each other. After which, the engine 10 continues to travel on down the assembly line for further attachment of components.

The head gasket assembly 18 is generally rectangular and has a length greater than its width by as much as 3 to 4 times the width. This rather long length and the flexibility of the head gasket body 40 make it difficult for the assembler to transport the gasket 18 from the crate to the engine block 12. The rigid characteristic of the fire ring 54 and the flexible characteristic of the main gasket body 40 tend to work against each other structurally trying to cause the two to separate during the transportation and assembly processes. Thus, the plurality of tape strips 60 which are used to assembly the wire ring 54 to the sealing material 46 of the main gasket body have been found to provide a intermediary between the rigid fire ring 54 and flexible main gasket body 40.

Thus, the head gasket assembly 18 provides a rigid fire ring 54 to seal the high temperature and high pressures within the combustion chamber 20 and the omission of heat conducting flanges, or rigid overlapping devices for attaching the fire ring 54 to the sealing material 46 prevents the heat transfer into the sealing material 46 of the main gasket body 40. Furthermore, the omission of heat conducting flanges or rigid overlapping devices for attaching the fire ring 54 to the sealing material 46 substantially reduces the load absorbed by the attaching devices and results in a more even and/or higher distribution of the load on the fire ring 54. The tape strips 60 further provides a transition joint between the rigid fire ring 54 and the flexible main gasket body 40 insuring a head gasket assembly which has very good handleability, sealability and functional characteristics.

Other aspects, objects and advantages of this invention can be obtained from a study of the drawings, the disclosure and the appended claims.

We claim:

1. A head gasket assembly (18) adapted for use in an engine (10) having a cylinder block (12) and a cylinder head (14), said cylinder block (12) having a combustion chamber (20), a plurality of threaded holes (26) and a plurality of bores (24) defined therein, said cylinder head (14) having a plurality of bores (30,32) defined therein corresponding to the threaded holes (26) and at least a portion of the plurality of bores (24) in the cylinder block (12), said head gasket assembly (18) comprising:

a main gasket body (40) having a center core (42), a sealing material (46) attached to each side of the core (42) and a plurality of apertures (48,50,52) defined within the main gasket body (40) and extending through the sealing material (46) and the core (42), said plurality of apertures (48,50,52) including a combustion opening (52) and at least a portion of the plurality of apertures (48,50,52) correspond to the combustion chamber (20), the plurality of threaded holes (26) and the plurality of bores (42) in the cylinder block (12) when in use;

a fire ring (54) positioned in each combustion opening (52), said fire ring having a weld joint; and means for attaching (59) the fire ring (54) to the sealing material (46) prior to being installed in the engine (10), said means for attaching (58) including a plurality of tape strips (60), each tape strip (60) having an end portion (62) attached to a side of the sealing material (46), partially surrounding the fire ring (54) and having another end portion (64) attached to another side of the sealing material (46), said weld joint being spaced from and intermediate a pair of said tape strips (60).

2. The head gasket assembly (18) of claim 1 wherein said core (42) is generally rigid.

3. The head gasket assembly (18) of claim 1 wherein said core (42) is flexible.

4. The head gasket assembly (18) of claim 1 wherein said fire ring (54) has a generally circular cross-sectional area.

5. The head gasket assembly (18) of claim 1 wherein said tape strips (60) are generally evenly spaced about combustion opening (52).

6. The head gasket assembly (18) of claim 1 further comprising a second sealing material (70) attached to preestablished portions of the sealing material (46).

7. The head gasket assembly (18) of claim 6 wherein said end portions (62,64) of the tape strip (60) do not overlap and contact the second sealing material (70).

8. A head gasket assembly (18) adapted for use in an engine (10) having a cylinder block (12) and a cylinder head (14), said cylinder block (12) having a combustion chamber (20), a plurality of threaded holes (26) and a plurality of bores (24) defined therein, said cylinder head (14) having a plurality of bores (30,32) defined therein corresponding to the threaded holes (26) and at least a portion of the plurality of bores (24) in the cylinder block (12), said head gasket assembly (18) comprising:

a main gasket body (40) including a sealing material (46) and having a plurality of apertures (48,50,52) defined within the main gasket body (40) and extending through the sealing material (46), said plurality of apertures (48,50,52) including a combustion opening (52) and at least a portion of the plurality of apertures (48,50,52) corresponding to the combustion chamber (20), the plurality of threaded holes (26) and the plurality of bores (24) in the cylinder block (12) when in use;

a first ring (54) having positioned in each combustion opening (52), said fire ring (54) having a weld joint; and means for attaching (58) the fire ring (54) to the sealing material (46) prior to being installed in the engine (10), said means for attaching (58) including a plurality of tape strips (60) being generally evenly spaced about the combustion opening (52), each tape strip (60) having an end portion (62) attached to a side of the sealing material (46), partially surrounding the fire ring (54) and having another end portion (64) attached to another side of the sealing material (46), said weld joint being spaced from and intermediate a pair of said tape strips (60).

9. The head gasket assembly (18) of claim 8 wherein said fire ring (54) has a generally circular cross-sectional area.

10. The head gasket assembly (18) of claim 8, further comprising a second sealing material (70) attached to preestablished portions of the sealing material (46).

11. The head gasket assembly (18) of claim 10 wherein said end portions (62,64) of the tape strips (60) do not overlap and contact the second sealing material (70).

12. An engine (10) comprising:

a cylinder block (12) having a combustion chamber (20), a plurality of threaded holes (26) and a plurality of bores (24) defined therein;

a cylinder head (14) having a plurality of bores (30,32) defined therein corresponding to the threaded holes (26) and at least a portion of the plurality of bores (24) in the cylinder block (12);

a head gasket assembly (18) sealingly positioned between the cylinder block (12) and the cylinder head (14) and including;

a main gasket body (40) being constructed of sealing material (46) and having a plurality of apertures (48,50,52) positioned within the main gasket body (40) and extending through the sealing material (46), said plurality of apertures (48,50,52) including a combustion opening (52) and at least a portion of the plurality of apertures (48,50,52) corresponding to the combustion chamber (20), the plurality of threaded holes (26) and the plurality of bores (42) defined in the cylinder block (12);

a fire ring (54) positioned in each combustion opening (52); and means for attaching (58) the fire ring (54) to the sealing material (46) prior to being installed in the engine (10), said means for attaching (58) including a plurality of tape strips (60), each tape strip (60) having an end portion (62) attached to a side of the sealing material (46), partially surrounding the fire ring (54) and having another end portion (64) attached to another side of the sealing material (46), said tape strips (60) are sheared when the head gasket assembly (18) is in sealing relationship to the cylinder block (12) and the cylinder head (14).

13. The engine (10) of claim 12 wherein said fire ring (54) has a generally circular cross-sectional area.

14. The engine (10) of claim 12 wherein said tape strips (60) are generally evenly spaced about the combustion opening (52).

15. The engine (10) of claim 12 further comprising a second sealing material (70) attached to preestablished portions of the sealing material (46).

16. The engine (10) of claim 12 wherein said end portions (62,64) of the tape strips (60) do not overlap and contact the second sealing material (70).

* * * * *